United States Patent [19]
Clerk

[11] 3,871,318
[45] Mar. 18, 1975

[54] ANTIFRICTION DEVICE FOR BOAT HULLS

[76] Inventor: Ernest Joscelyn Clerk, 18 South Ave., Rest Pen, Kingston 10, British W. Indies

[22] Filed: Aug. 3, 1973

[21] Appl. No.: 385,569

Related U.S. Application Data

[62] Division of Ser. No. 262,214, June 13, 1972, abandoned.

[52] U.S. Cl. .............................................. 114/67 A
[51] Int. Cl. ............................................ B63b 1/38
[58] Field of Search ............ 114/67 R, 67 A; 115/11

[56] References Cited
UNITED STATES PATENTS

| | | | |
|---|---|---|---|
| 1,408,178 | 2/1922 | Downing | 114/67 A |
| 1,824,313 | 9/1931 | Vogler | 114/67 A |
| 2,234,899 | 3/1941 | Higgins | 114/67 A |
| 3,027,860 | 4/1962 | Priest | 114/67 A |
| 3,267,898 | 8/1966 | Evans | 114/67 A |
| 3,316,874 | 5/1967 | Canazzi | 114/67 A |
| 3,352,270 | 11/1967 | Payne | 114/67 A |

*Primary Examiner*—Lloyd L. King
*Assistant Examiner*—Randolph A. Reese
*Attorney, Agent, or Firm*—Ostrolenk, Faber, Gerb & Soffen

[57] ABSTRACT

A boat hull provided on its bottom with a slot extending transversely of the length of the hull; a flap hingedly connected at the forward edge of the slot for being selectively opened to varying extent and creating a low pressure area behind the flap which draws ambient air through the slot and provides air lubrication beneath the boat hull.

7 Claims, 8 Drawing Figures

ANTIFRICTION DEVICE FOR BOAT HULLS

This is a division of Application Ser. No. 262,214, filed June 13, 1972 now abandoned.

This invention relates to hulls for boats for example for sailing boats, particularly of the kind generally referred to as sailing dinghies but can also be used in the construction of power driven boats.

Boats sail most efficiently when the boat is upright in the water. Thus, boats fitted with sails, sail most efficiently with the mast, keel and rudder perpendicular to or substantially perpendicular to the surface of the water. However due to the wind effects boats keel over so that the sail or sails, keel and rudder are not functioning efficiently. The movement of a boat through the water is also restrained due to the large wetted area of the boat hull and the drag thereby created. These disadvantages are not so pronounced with catamarans which sail successfully due to the provision of two hulls which maintain a catamaran in an upright position and also to the low wetted area.

An object of the invention is to provide a single hulled boat which will sail efficiently whether upright or keeled over, the hull construction providing a minimum wetted area when for example, a sailing boat is tacking and when the boat is sailing before the wind.

According to the invention, a boat hull is provided having a transom bow and flat bottom, the bottom being curved lengthwise from the bow to the stern, the sides of the hull also being curved lengthwise, the hull bottom and sides having the same curvature so that lines bisecting the angles which the sides make with the bottom are in the same plane. This construction produces chines on each side of the hull which are straight and each of which will act as a keel when the boat keels over for example when tacking. Using each chine as a keel has the advantage that the hull will have a minimum wetted area when keeled over whereby the drag is reduced.

To still further increase the sailing efficiency of a sailing boat advantageously the mast is mounted so that the same can swing laterally of the hull whereby the sails can be maintained in a position to obtain the maximum wind effect. Similarly the rudder can be mounted so that its position can be maintained perpendicular to or substantially perpendicular to the surface of the water. The swinging movements of the mast and rudder can be effected independently of one another or if desired such movements can be effected jointly.

The hull can also have a narrow keel extending lengthwise of each chine, each said narrow keel being in alignment with the lines bisecting the angles between the sides and bottom of the hull. Advantageously each narrow keel extends only partially along the length of the chine. For example each narrow keel can extend from approximately halfway the length of the hull to the stern transom. The provision of the narrow keels assist the sailing of the boat and would serve to prevent a sailing boat from drifting when sailing before the wind and so serve to keep the boat on course and further when a sailing boat is tacking into the wind would act to make the appropriate chine more effective in keeping the boat on course.

Means can also be provided to assist in further reducing the wetted area of the hull. Such means can comprise a flap extending transversely across the bottom of the hull, the flap being movable from a retracted position to a lowered position. When the boat has reached sufficient speed in an upright position the flap can be moved to the lowered position, thus creating a low pressure area at the trailing edge of the flap the creation of the low pressure area being utilised to extract air from inside the hull and direct the same along the bottom of the hull, the air passing along beneath the hull between the narrow keels to be discharged at the stern. For the extraction of the air the hull can have a slot extending transversely across the bottom the flap being disposed so as to extend along the forward edge of the slot the flap in the retracted position extending over the slot. Inside the hull, two partition walls extend transversely one along each edge of the slot the walls preventing water from entering the hull. If desired a cover can be provided at the upper ends of the partition walls thus providing an enclosed box into which compressed air could be supplied when the flap is lowered thus still further increasing the effect of air flow to reduce the wetted area of the hull.

The hull can be made in any suitable material. For example the hull can be of plywood construction or constructed as a moulding using fibreglass, the latter construction facilitating production of the compound curves and flat surfaces.

An embodiment of the invention will now be described by way of example with reference to the accompanying drawings in which.

Figure 4:
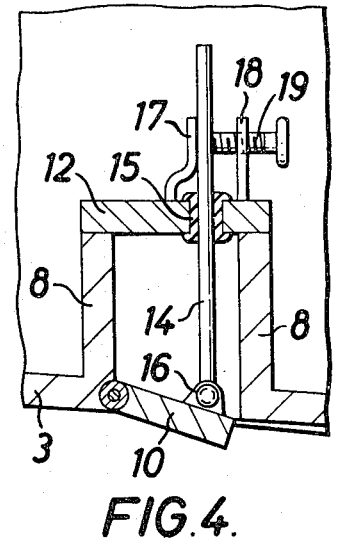
Figure 3:
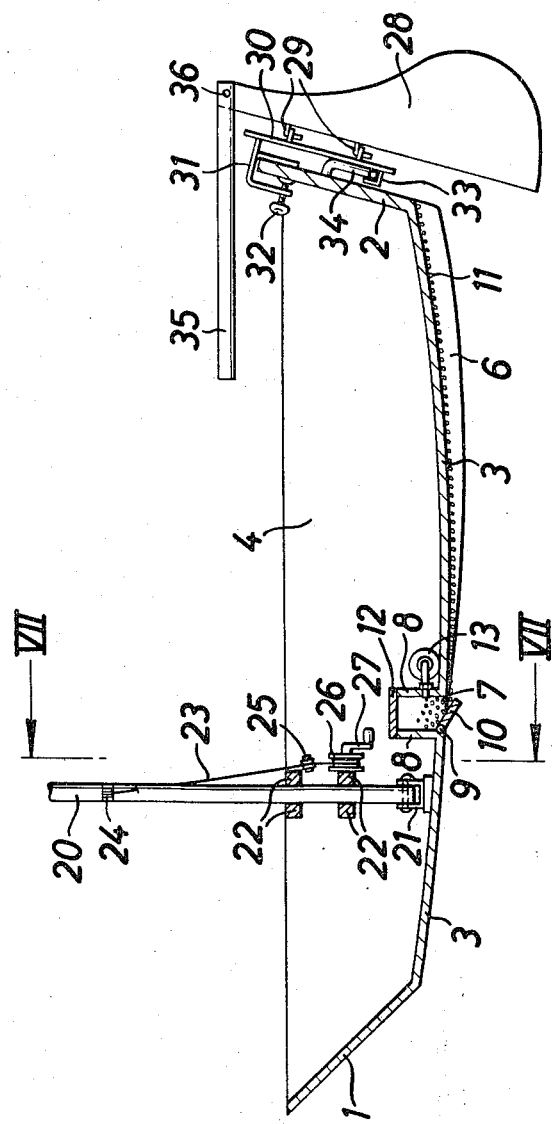
Figure 5:
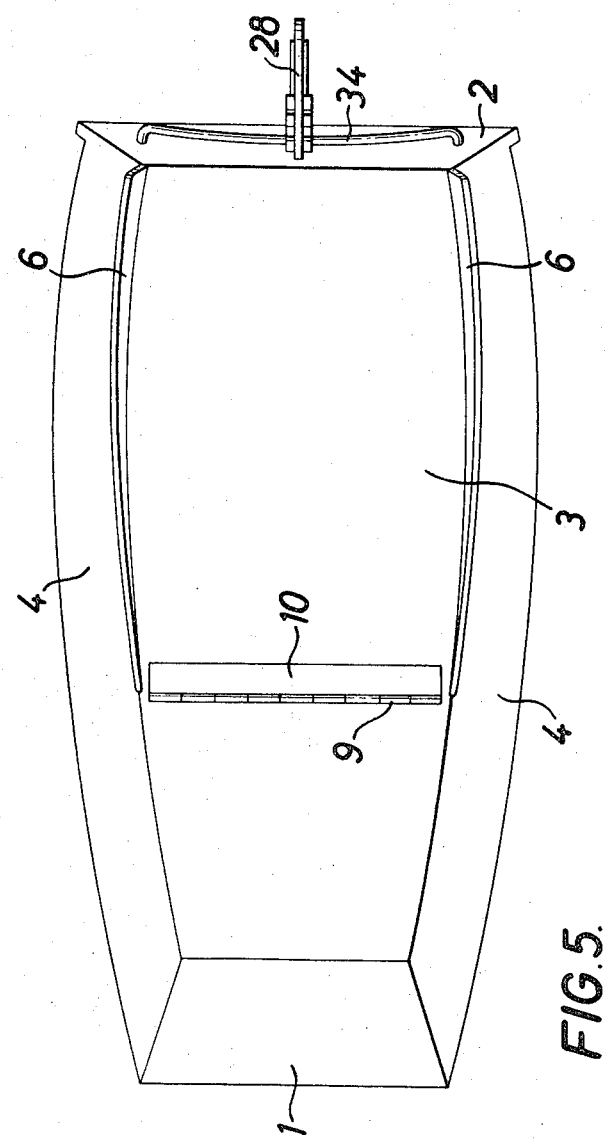
Figure 6:
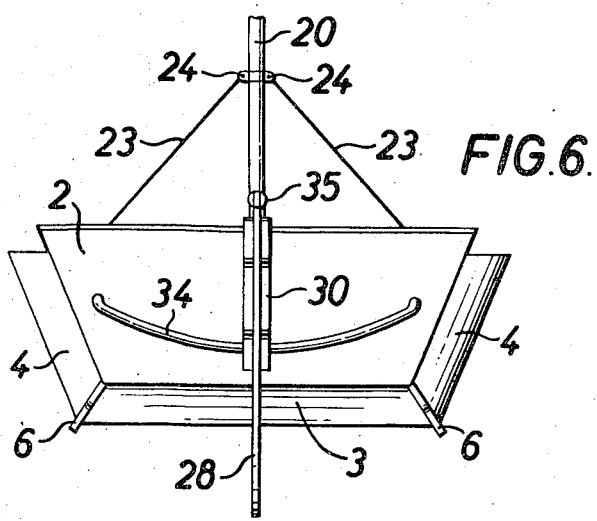
Figure 7:
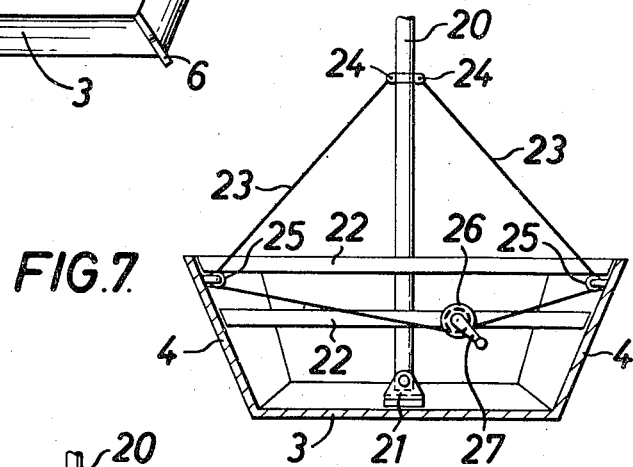
Figure 8:
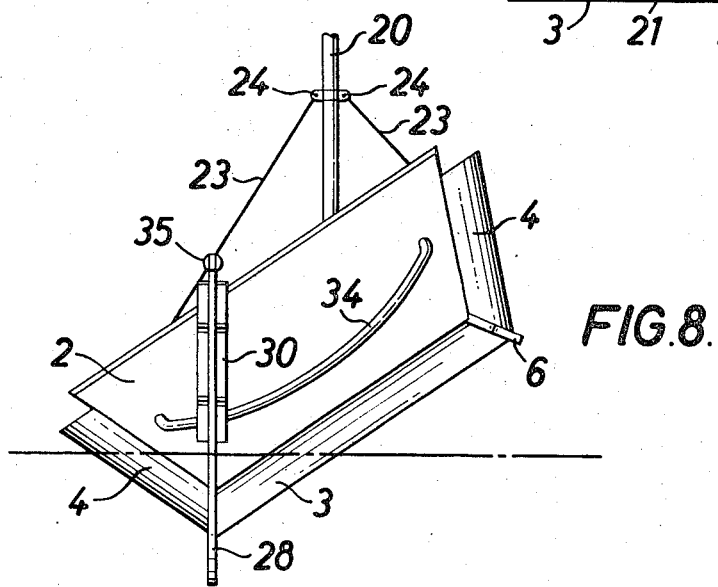

FIG. 3 is a longitudinal section of a sailing boat having a hull of the invention, FIG. 4 is an enlarged fragmentary view of a detail of the hull, FIG. 5 is an underneath plan view of the hull, FIG. 6 is an end view as seen from the stern of the boat of FIG. 3, FIG. 7 is a section on the line VII — VII in FIG. 3, and FIG. 8 is an end view as seen from the stern of the boat of FIG. 3 showing the hull keeled over.

Figure 1:
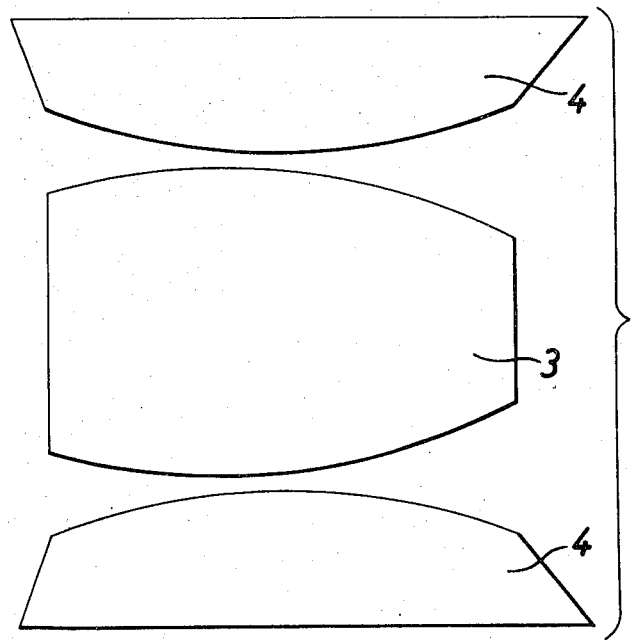
FIG. 1 is an exploded view showing the sides and bottom of the hull.
Figure 2:
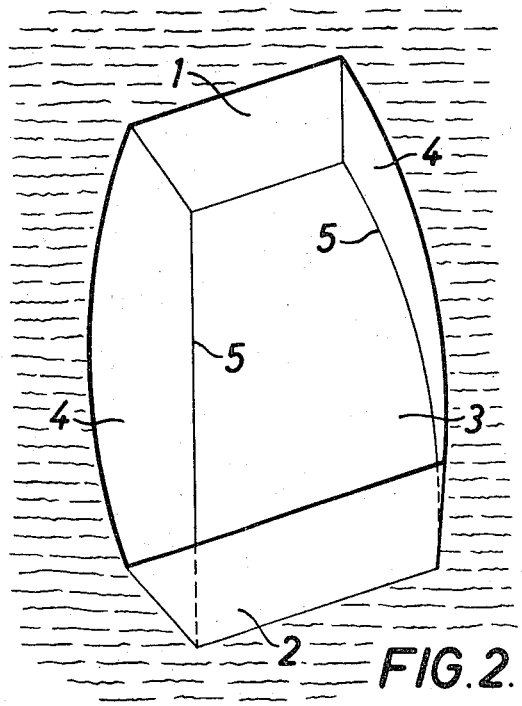
FIG. 2 is a perspective view of the hull from above.

Referring to FIGS. 1 and 2 of the drawings the hull has a transom bow 1 and stern 2, a flat bottom 3 which is curved in its lengthwise direction and sides 4 which are also curved in their lengthwise direction each side extending outwardly at an angle in relation to the bottom of the hull. The hull bottom and sides have the same curvature so that lines bisecting the angles which the sides of the hull make with the bottom of the hull are in the same plane. With this construction each chine 5 is straight and one or the other will function as a keel when the boat keels over for example when a sailing boat is tacking. Sailing in this manner using one chine 5 or the other as a keel will result in the hull having the least wetted area whereby drag is reduced.

As shown in FIGS. 3 to 7 the underside of the hull can be provided with two narrow keel plates 6 one of which extends lengthwise of and in line with each chine 5. The keel plates 6 are each angularly arranged the keel plates projecting outwardly at an angle so that they diverge from one another. Each keel plate 6 extends only partially the length of the hull. For example from the stern to a point beyond the middle of the hull as shown.

To provide for a flow of air beneath the bottom of the hull to further reduce the wetted area and as shown in FIGS. 3 to 7, the bottom 3 of the hull has a slot 7 extending transversely thereof the slot being disposed for example in the length of the hull nearer the bow than the stern. Extending upwardly into the hull and along each lengthwise extending edge of the slot is a partition wall 8, the walls preventing the flow of water into the boat. Pivotally connected to the forward edge of the slot 7 by a hinge 9 is a flap 10 which can be raised or lowered from the inside of the hull by any suitable operating means. The flap 10 extends lengthwise of the slot 7 and when raised closes the slot. By lowering the flap, when the boat has reached sufficient forward speed, air will be caused to flow through the slot 7 and along the bottom of the hull to the stern, the stream of air indicated by 11, thus assisting in reducing the wetted area of the hull. A cover 12 can be provided to close the gap between the upper ends of the partition walls 8 thus forming an enclosed box construction into which compressed air can be supplied from a pump or compresser 13 in the hull, the compressed air providing a greater flow of air than that provided by extraction due simply to the forward motion of the boat. If the hull is provided with the keel plates 6 as above referred to each keel plate can extend from the after edge of the slot 7 in the bottom of the hull to the stern, the stream of air flowing along the passage formed between the keel plates 6.

The hull according to the particular embodiment described above can be made for example in plywood or as a molding using glassfibre reinforced plastics. This latter form of construction considerably facilitates hull production as components such as the keel plates, partition walls and cross beams for the pivotal mounting of a mast as later described can be produced in the moulding.

A simple construction of mechanism for raising and lowering the flap 10 is shown in FIG. 4. A rod 14 extends through an aperture in the cover 12 the rod being slidable in a sealing grommet 15 in the aperture. The lower end of the rod 14 is pivotally coupled by pivotal connection 16 to the flap. The upper end of the rod extends between two brackets 17, 18 mounted on the cover 12 and disposed opposite to one another. Bracket 18 has a tapped hole to receive a clamping screw 19 which when tightened presses rod 14 against bracket 17 to clamp the rod in a vertically adjusted position whereby the flap 10 can be held in any desired angularly adjusted position.

FIGS. 3 to 8 of the drawings show a sailing boat having a hull constructed as above described. As shown the hull is adapted for the mounting of a mast 20 which permits the mast to swing laterally of the hull so that when the boat keels over the mast can assume an upright position whereby the sails will provide the greatest effect. For this purpose the mast is mounted so as to be capable of pivoting on a pivotal mounting 21 disposed on the hull at the foot of the mast, the mast extending upwardly through guide slots disposed one above the other and extending transversely of the hull. Each slot is provided by a gap between two beams 22 extending to one another between the sides of the hull. The pivotal mounting for the mast can be disposed at any suitable position in the length of the mast disposed within the depth of the hull.

When the boat keels over, the position of the mast is adjusted by adjusting mechanism which as shown consists of an endless stay 23 opposite ends of which are anchored to diametrically opposite eyes 24 secured to the mast above the hull. The stay passes around pulleys 25 disposed one on each side of the hull and is coiled around a reel 26 mounted in the hull, as shown on one of the beams of the lower pair of beams 22, the reel having a crank handle 27 for rotating the reel. Rotation of the reel in one direction or the other will result in appropriate swinging movement of the mast to the vertical position when the boat keels over, the reel being again rotated when the boat assumes an even keel to again adjust the mast relative to the hull.

The rudder 28 can also be mounted so that the same is swingable transversely of the hull whereby the same can be adjusted to assume an upright position in relation to the hull when the same keels over. For this purpose pivotal mountings 29 on which the rudder is stepped are carried by a mounting plate 30 which is assembled on the stern transom 2 so as to extend vertically. The mounting plate has a clamp 31, provided with a clamping screw 32, at its upper end which engages over the upper edge of the stern transom 2 for securing the mounting plate in position. At its lower end the clamping plate has a bracket 33 of U form in which a guide rail 34 is disposed, the guide rail 34 being mounted on the stern transom 2 so as to extend transversely thereof. The guide rail 34 is curved lengthwise the curvature permitting swinging movement of the rudder 28 when the same is adjusted to an upright position when the boat keels over. The rudder tiller 35 is also pivotally connected at 36 to the upper end of the rudder so that the tiller can be maintained in correct position to the rudder when the position of the same is adjusted.

I claim:

1. A sailing boat including a hull having a flat bottom, rudder means mounted to said hull, the bottom of the hull having a slot extending transversely thereof and communicating with ambient air, a partition wall extending upwardly from and along each transverse edge of the slot within the hull, a flap extending transversely across the bottom of the hull and on the exterior thereof, the flap being disposed with the leading edge thereof extending along the leading edge of the slot and to which it is hingedly connected by a hinge coupling and means operable from inside the hull for effecting hinged movement of the flap, said flap being of a length such that it extends across the space between the leading edge of the slot and the trailing edge thereof and the flap is adjustably movable from a position where it contacts the trailing edge of the slot and closes the slot to selected hinged positions opening the slot to a varying extent to direct air flow rearward from said slot against said hull bottom, thereby reducing wetted areas of said hull bottom when said boat is being wind-propelled, and means for holding said flap in said selected positions.

2. A boat hull according to claim 1 wherein a cover is provided to close the gap between the upper edges of the partition walls the walls and cover providing a box open at its lower end by the slot.

3. A sailing boat according to claim 2 wherein means are provided in the hull for positively injecting air into the slot for discharge therethrough at the hull bottom.

4. The sailing boat of claim 1, wherein the flap, when in said selected hinged positions, constitutes a transverse variable height element projecting downward from said hull bottom.

5. The sailing boat of claim 1, wherein the hull has a transom bow, and the hull bottom is curved lengthwise from the bow to the stern, the sides of the hull also being curved lengthwise; the hull bottom and sides having the same curvature so that lines bisecting the angles which the sides make with the bottom are in the same plane to produce a chine on each side of the hull each of which is straight so as each to act as a keel.

6. A sailing boat according to claim 1, wherein the slot is positioned on the bottom of the hull rearward of the bow and forward of the stern.

7. A sailing boat according to claim 6, wherein said flap, when in said selected hinged positions, constitutes a transverse variable height element projecting downward from said hull buttom.

* * * * *